United States Patent [19]

Aschwanden

[11] 4,263,609
[45] Apr. 21, 1981

[54] AUTOMATIC DEVIATION LIMIT CONTROL CIRCUIT FOR SECAM ENCODERS

[75] Inventor: Felix Aschwanden, Thalwil, Switzerland

[73] Assignee: RCA Corporation, New York, N.Y.

[21] Appl. No.: 93,222

[22] Filed: Nov. 13, 1979

[30] Foreign Application Priority Data

Apr. 5, 1979 [GB] United Kingdom ............... 12023/79

[51] Int. Cl.³ .............................................. H04N 9/40
[52] U.S. Cl. ................................................... 358/14
[58] Field of Search ............................. 358/10, 12, 14

[56] References Cited

FOREIGN PATENT DOCUMENTS 2247367 3/1974 Fed. Rep. of Germany ............. 358/14
2544311 4/1976 Fed. Rep. of Germany ............. 358/14

Primary Examiner—Robert L. Richardson
Attorney, Agent, or Firm—Eugene M. Whitacre; Paul J. Rasmussen; Henry I. Steckler

[57] ABSTRACT

An automatic deviation limiting control circuit for a SECAM camera features a circuit for comparing the deviated subcarrier frequency of SECAM vertical identification pulses with a reference signal. A deviation limiter control signal in accordance with the difference between said identification and reference signals is applied to a limiter circuit for limiting the deviation.

9 Claims, 12 Drawing Figures

AUTOMATIC DEVIATION LIMIT CONTROL CIRCUIT FOR SECAM ENCODERS

BACKGROUND OF THE INVENTION

The present invention relates to an automatic deviation limiting circuit, and more particularly, to one useful in a SECAM encoder.

Recent developments concerning the French SECAM standard reveal that several tolerances of the SECAM system will be made much tighter in the future. This not only leads to problems in designing encoder circuits, but also makes it difficult to adjust SECAM encoders in the production line. Test equipment such as vectorscopes, which allow simple and precise adjustment of NTSC or PAL encoders, do not exist for SECAM. Therefore, it is very desirable to introduce self-adjusting circuits in SECAM encoders, in particular automatic deviation limiters.

SUMMARY OF THE INVENTION

It is therefore desirable to provide an automatic deviation limiting control circuit and method, in particular, as used in a SECAM encoder.

In brief, this is achieved by having means for comparing the deviated subcarrier frequency of SECAM vertical identification pulses with a reference signal, means for generating a deviation limit control signal in accordance with the difference between said identification and reference signals, and a deviation limiter circuit that controls the deviation in accordance with the deviation control signal. Thus no manual adjustment is necessary.

DESCRIPTION OF THE INVENTION

The SECAM system uses a frequency modulation of the subcarrier by the line sequential color difference signals. The center frequency of the color subcarrier is $F_{OB} = 4.25$ MHz for the B-Y signal and $F_{OR} = 4.40625$ MHz for the R-Y signal. The maximum deviation of the subcarrier is represented by $D_B$ and $D_R$ for the B-Y and R-Y signals respectively and should be kept to an accuracy of 10 kHz. During the occurrence of horizontal synchronization pulses, the modulator is resynchronized to $F_{OB}$ or $F_{OR}$.

Figure 1:
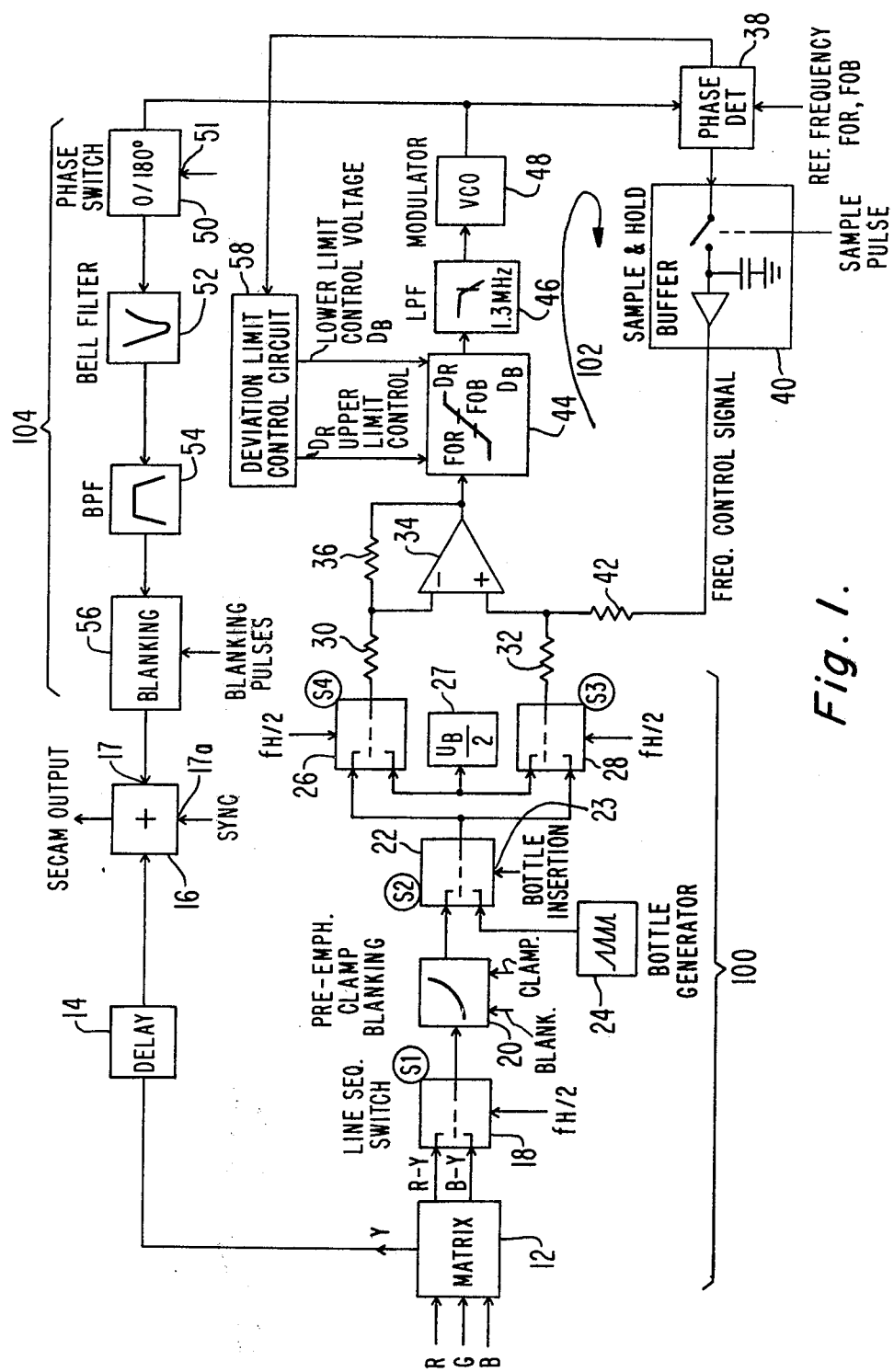
FIG. 1 shows a block diagram of an encoder using the invention.

FIG. 1 shows a circuit capable of doing this which uses the circuit of the invention. The first portion 100 is a baseband signal processing portion that takes three primary color signals and forms properly pre-emphasized and clamped line sequential signals having line identification signals. These signals are applied to a frequency control loop 102 that provides a baseband SECAM FM color signal from VCO 48 in accordance with the line sequential signals. The FM signal is then applied to a high frequency signal processing portion 104 that does alternate-line phase inversion, more pre-emphasis, and filtering.

Now examining FIG. 1 in more detail, the R, G, and B signals from an appropriate source, such as camera pickup tubes, are applied to a matrix 12. One output provides the luminance signal Y which is applied to a delay circuit 14, which compensates for the inherent circuitry delay that chrominance signals applied to input 17 of adder 16 undergo. From there the luminance signal is applied to adder 16, which also receives composite synchronization signals at input 17a. Color difference signals (R-Y, B-Y) are also produced by matrix 12, are alternately fed through line sequential switch 18, which receives a half line frequency switching control signal, $(f_H/2)$, to a pre-emphasis, clamping and blanking circuit 20, which receives blanking and clamping pulses. In circuit 20, the color difference signals are given a low frequency pre-emphasis, in accordance with SECAM standards. Then they are clamped to a voltage $U_B/2$ during the blanking interval. From circuit 20 the color difference signals go to a switch 22. During the vertical identification period, which is a time period during the field blanking time when signals are sent that indicate which color difference signal is being transmitted, switch 22, which is controlled by a bottle insertion signal applied to control input 23, connects the sawtooth output signal of the bottle generator 24 (which is formally called a SECAM line identification signal generator) to the one input of each of the switches 26 and 28. At other times one of the color difference signals are applied to switches 26 and 28. Switches 26 and 28 are controlled by means of an $f_H/2$ signal, similar to the operation of switch 18. During the occurrence of the B-Y line, resistor 30 is connected to a voltage source 27 of value $U_B/2$ through switch 26, while resistor 32 is connected to the output of switch 22 through switch 28 so as to feed the B-Y signal to the non-inverting input of the amplifier 34. During the occurrence of the R-Y line, the output of switch 22 is connected to resistor 30 through switch 26 to the inverting input of amplifier 34. At the same time, voltage source 27 is connected by switch 28 to resistor 32 to the non-inverting input. This alternation of the color signals applied to amplifier 34 alternates the direction of deviation of the R-Y and B-Y color signals. Resistor 36 supplies negative feedback to control the gain of amplifier 34. Also a center frequency control signal generated by means of a phase detector 38, that receives during alternate lines the frequencies $F_{OR}$ and $F_{OB}$, and a sample-and-hold circuit 40, is added at the non-inverting input of amplifier 34 through resistor 42. The sample pulse for sample-and-hold circuit 40 comprises a horizontal synchronization pulse. This resynchronizes VCO 48 to the frequencies $F_{OR}$ or $F_{OB}$ during the horizontal synchronization period. After passing through an amplitude limiter stage 44, that controls the deviation limits, and a low pass filter 46, which has a cutoff frequency of about 1.3 MHz, the output signal of amplifier 34 modulates the frequency of the voltage controlled oscillator 48 when it is not being resynchronized. The output of the voltage controlled oscillator 48 is applied to subcarrier phase switch 50, which receives a switching signal at input 51 to cause a 180 degree phase inversion each frame and also on one line out of every three in accordance with SECAM standards. The output of switch 50 is fed through a bell shaped response filter 52 to increase the color subcarrier amplitude during high subcarrier frequency deviation amplitude which also is in accordance with SECAM standards. A band pass filter 54, which has a band pass of from 3 to 5.5 MHz, receives the output of filter 52 and applies it to a blanking circuit 56, which receives blanking pulses, before the FM color signal is added to the Y and composite sync signals by adder 16. A deviation control circuit 58 (described below) is coupled to phase detector 38 and limiter stage 44 to set the maximum deviation.

Figure 2:
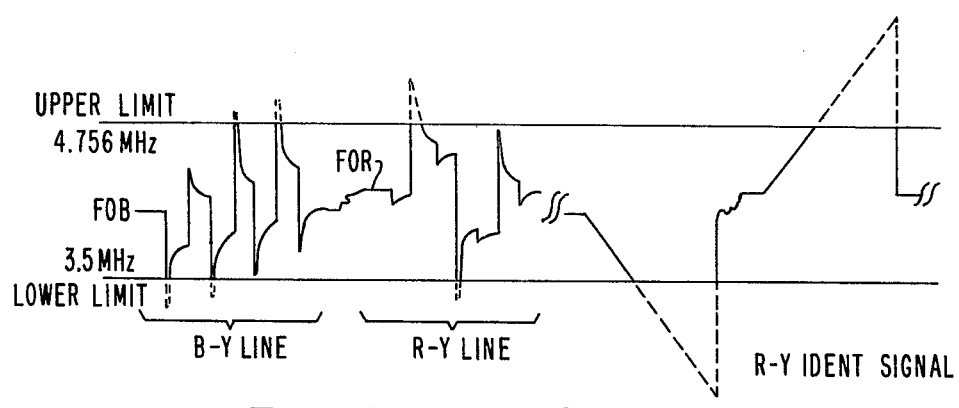
FIG. 2 shows a time diagram of a SECAM signal.

The maximum allowed deviation of the VCO 48 is 506 kHz in one direction and 350 kHz in the other direction, for each signal R-Y and B-Y, respectively, although the limits are in opposite directions for the two chroma difference signals. The limiter 44 linearly amplifies normal amplitude signals, while high (pre-emphasized) signal amplitudes, as well as the sawteeth of the SECAM identification signals (bottles) are clipped as shown in FIG. 2. The frequency control signals, as applied through resistor 42, introduces frequency offsets and controls the frequencies $F_{OR}$, $F_{OB}$ of the undeviated subcarrier, as explained above.

Figure 3:
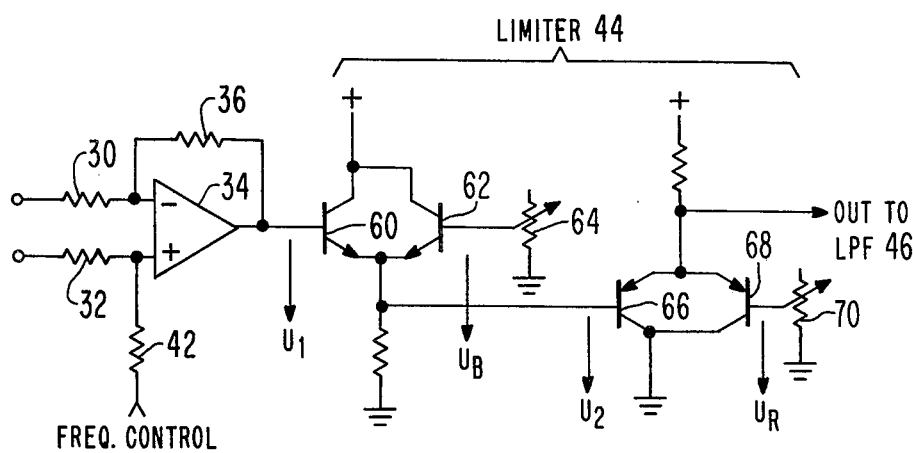
FIG. 3 shows a deviation limiter control circuit.
Figure 4:
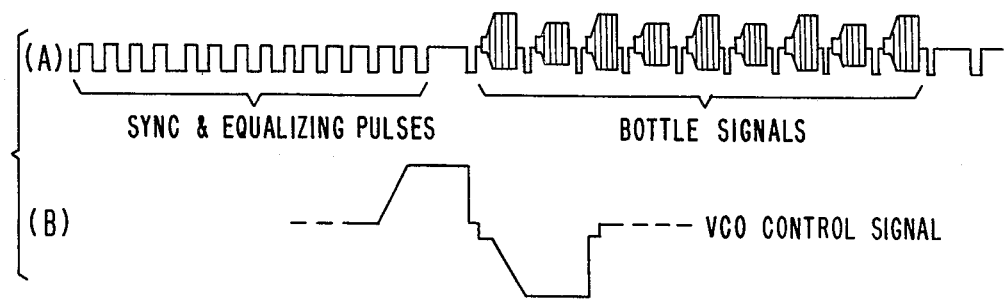
FIG. 4 shows a time diagram of a SECAM and a frequency control signal.

FIG. 3 shows details of a limiter circuit 44 which is often used in SECAM encoders. The operation is as follows. Transistor 60 operates in the active region and its input voltage is translated to its emitter, as long as its base voltage $U_1$ is $>U_B$, the base voltage of transistor 62. If $U_1$ goes below $U_B$, transistor 60 cuts off and the voltage at the emitters of transistor 60 and 62 will remain constant at one $V_{BE}$ below the voltage from the slider or potentiometer 64 with transistor 62 active. The lower clipping level therefore is adjustable by means of potentiometer 64. Transistors 66 and 68 operate in a similar manner for the upper clipping level which is adjustable by means of potentiometer 70. Potentiometers 64 and 70 are replaced by two DC voltage sources for use with the circuit described below. To generate the two DC voltages, the peak deviation of the SECAM identification signal (bottles) is compared with a reference signal. Two DC signals are obtained and fed to the bases of transistor 62 and 68, respectively, in order to automatically control the deviation limits. FIG. 4a shows the SECAM line identification signals that are transmitted on nine lines following the vertical equalizing pulses and have a linear increase in subcarrier frequency for the R-Y line and a linear decrease in subcarrier frequency for the B-Y line. After reaching the deviation limits ($D_R$, $D_B$) the frequency remains constant. FIG. 4b shows on an expanded scale the VCO frequency control signal needed to achieve this.

Figure 5:
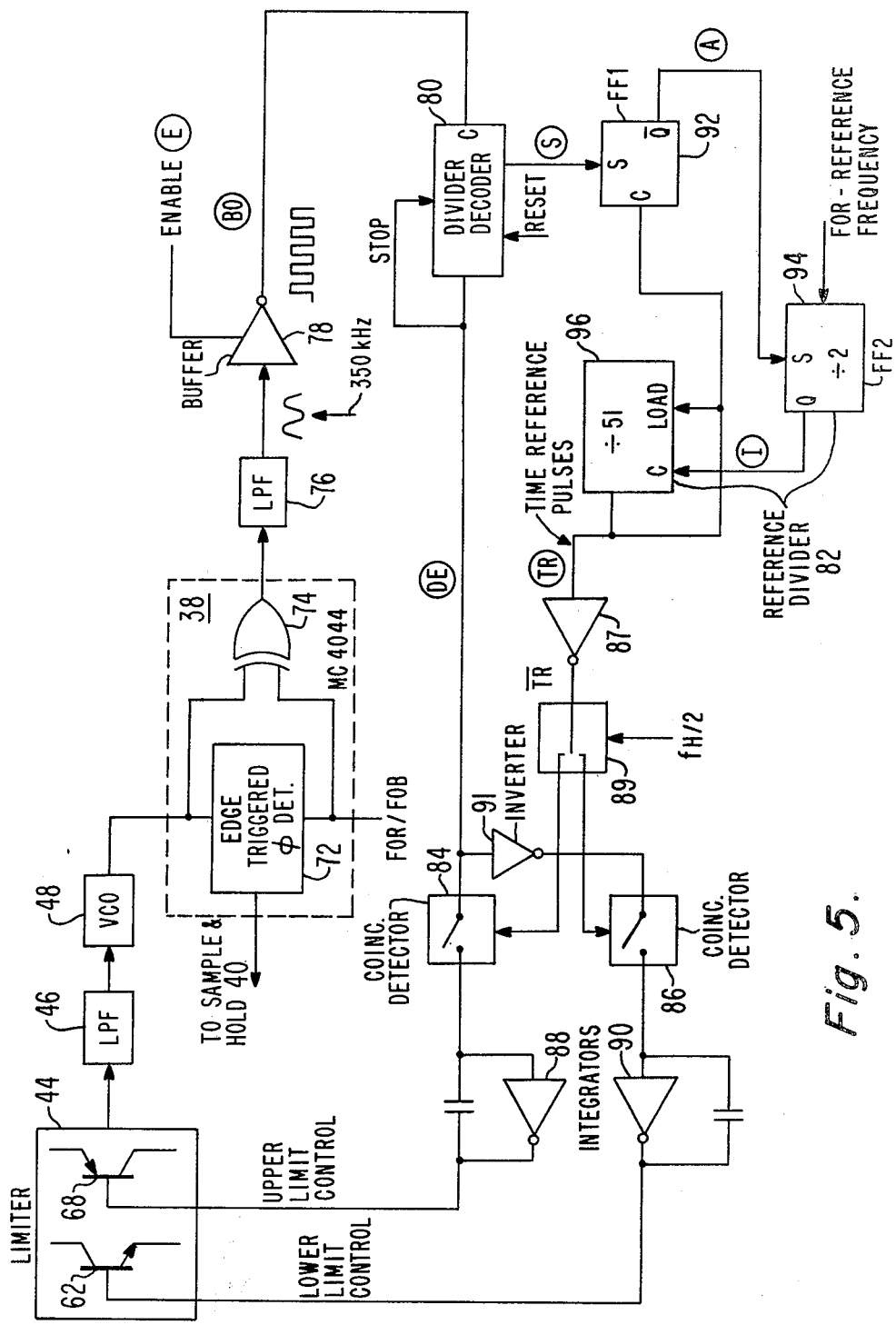
FIG. 5 shows a deviation limit control circuit for use with the circuit of FIG. 3.

FIG. 5 shows the circuit of the invention in block diagram form. The output of the VCO 48 is fed to the phase detector 38 (MC 4044 Motorola) which contains an edge triggered phase detector 72 used to synchronize the VCO 48 (using a frequency control signal), and an exclusive OR gate 74, which operates as a frequency mixer for VCO 48 and the reference frequency applied to phase detector 38. More specifically, this difference frequency is 350 kHz for the constant part of the bottles if the deviation limits are exact, ($\pm 350$ kHz$=D_R-F_{OR}=D_B-F_{OB}$). Note that the reference frequency at the input of the phase detector is $F_{OR}$ for the R-Y line and $F_{OB}$ for the B-Y line. If the deviation exceeds 350 kHz, the difference frequency is decreased and if the deviation is less, the difference frequency increases.

Figure 6:
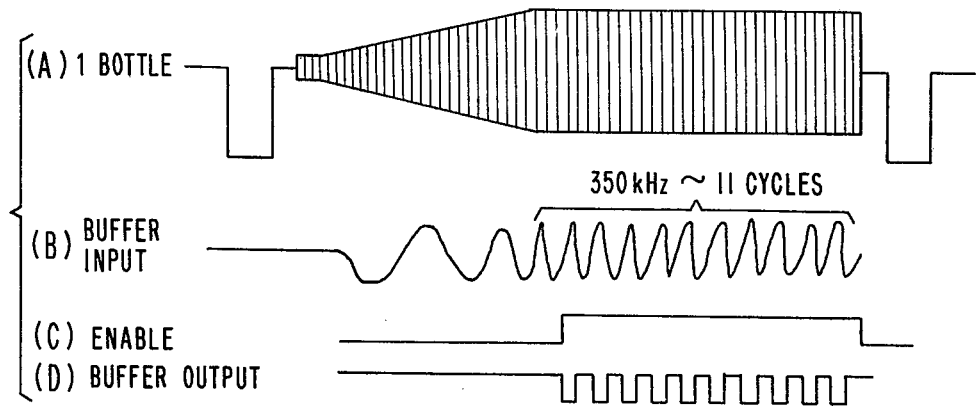
FIGS. 6, 7, 8, and 9 show some time diagrams of signals present.

The output of the EX-OR gate 74 is low pass filtered by low pass filter 76 and fed to a buffer op-amp 78 whose gain is so high that it saturates thereby producing square waves called "BO" (Buffer Output). An enable signal, E shown in FIG. 6c is generated from a circuit described below and is applied to buffer 78 to ensure that only during the constant frequency (maximum deviation) part of the bottles, see FIG. 6a, are pulses fed to a divider-decoder 80. The buffer input signal comprises about 11 cycles of 350 kHz signal during the time the buffer is gated into conduction when the enable signal is high, see FIG. 6b. The buffer output signal BO, FIG. 6d, goes to counter-decoder 80 where it is divided by 8. One output of this counter decoder 80 is used to start a reference divider 82 which generates a time reference pulse by dividing the constant reference frequency by a predetermined number. This reference pulse is fed through inverter 87 and switch 89 for enabling the coincidence detectors for a particular interval to two coincidence detectors 84 and 86 (one for $D_R$, one for $D_B$). The output of divider-decoder 80 is applied directly to detector 84 and through inverter 91 to detector 86. If the divided by 8 output of the divider-decoder 80 is in coincidence with the time reference pulse, the output of integrators 88 and 90, which provide the upper and lower limit voltages, respectively do not change and the deviation limits are exact. If the deviation is greater or less than the prescribed value, the divided-by-eight signal will not exactly coincide with the time reference value, and voltage on detectors 84 and 86 will change until coincidence is achieved.

Figure 7:
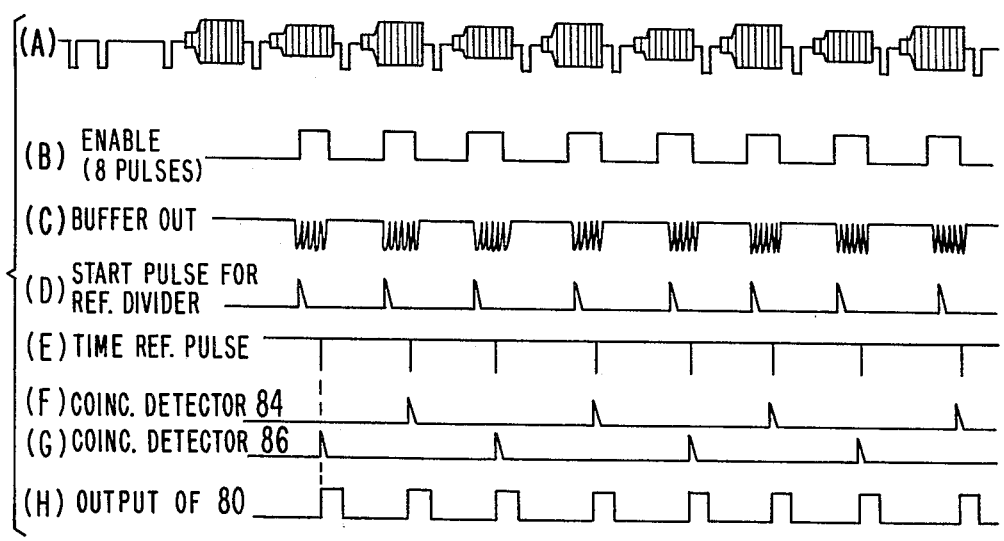
Figure 8:
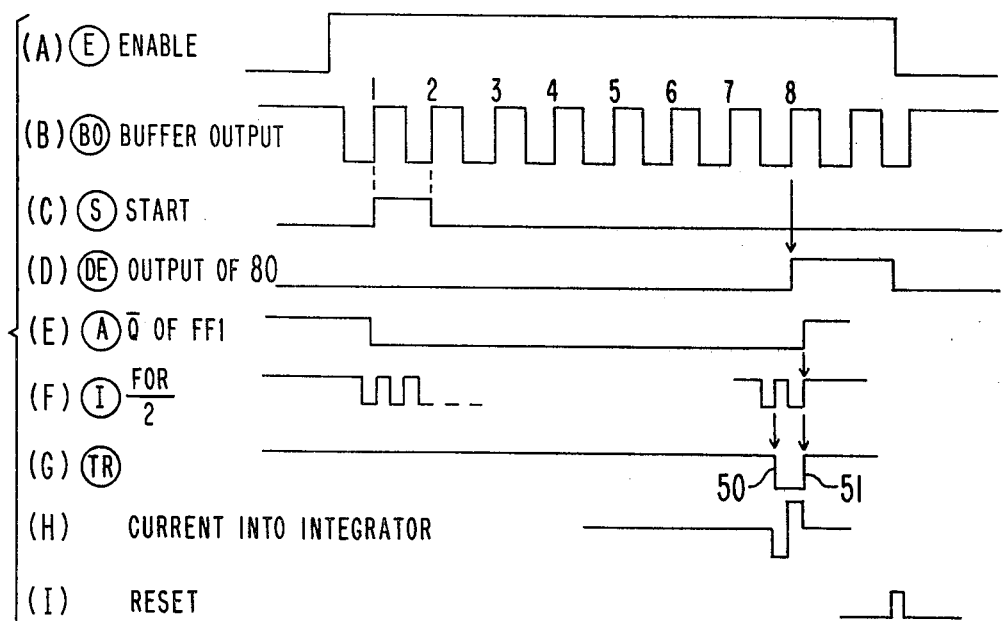

FIG. 7 shows the associated waveforms in more detail. By referring to it and to FIG. 8, which shows some of the same waveforms in expanded scale, the detailed operation of the circuit of FIG. 5 is as follows.

The first positive transition (1) of the BO (Buffer Output) signal shown in FIGS. 8b and 7c is transmitted to the set input of flip-flop 92, see FIGS. 8c and 7d. Its output-Q goes low, see FIG. 8e, and enables flip-flop 94 to divide the reference subcarrier $F_{OR}$ by two. Positive transitions of output Q of flip-flop 94, signal I, FIG. 8f, clock the divide by 51 circuit 96. After 50 clock pulses the output of the divide by 51 circuit 96 (time reference signals TR, FIG. 7e) goes low, while it goes high again with the next positive transition of signal I, see FIGS. 8f and 8g. The positive transition of signal TR loads the divide by 51 circuit 96 and also triggers flip-flop 92 through its clock input. Signal A of FIG. 8e goes high and disables the divide by 2 circuit (flip-flop 94). At the same time, the divider-decoder 80 continues to count the signal BO (FIG. 8b). After 8 pulses of the BO the output of the divider-decoder 80 (signal DE FIGS. 8d and 7h) goes high and disables itself (stop).

The time reference pulses TR closes the coincidence detector switch 84 or 86 (depending on the signal $f_H/2$ at switch 89) and connects signal DE to the input of one of the integrators 88 or 90. If DE and TR are in coincidence, the current into the active integrator consists of a positive and a negative part of equal amplitudes, and therefore the limit control voltages do not change, see FIG. 8h. If DE leads TR, i.e. the frequency of BO is $>350$ kHz, the current into the integrator is only positive for detector 84 and the upper limit control voltage decreases. For detector 86 it is only negative and the lower limit control voltage increases. If TR lags DE, the voltage changes of the control voltages go in the opposite direction. The divider ratio of the divide by 51 divider 96 is calculated as follows.

$$8 \text{ pulses of } BO = \frac{1}{350 \text{ kHz}} \times 8 = 22.857 \text{ } \mu s$$

$$1 \text{ subcarrier cycle} = \frac{1}{4.40625} = 226.95 \text{ ns}$$

$$\frac{22.857 \text{ } \mu s}{226.95 \text{ ns}} = 100.71 \simeq 101$$

At the end of a horizontal line a horizontal sync pulse is applied to the reset input of divider 80.

Figure 9:
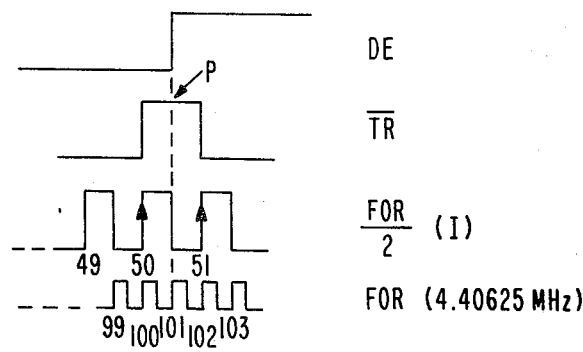

In FIG. 9 it can be seen that the center point P of the time reference pulse TR corresponds to the 101st pulse of $F_{OR}$ if the reference divider is programmed to 51.

Figure 10:
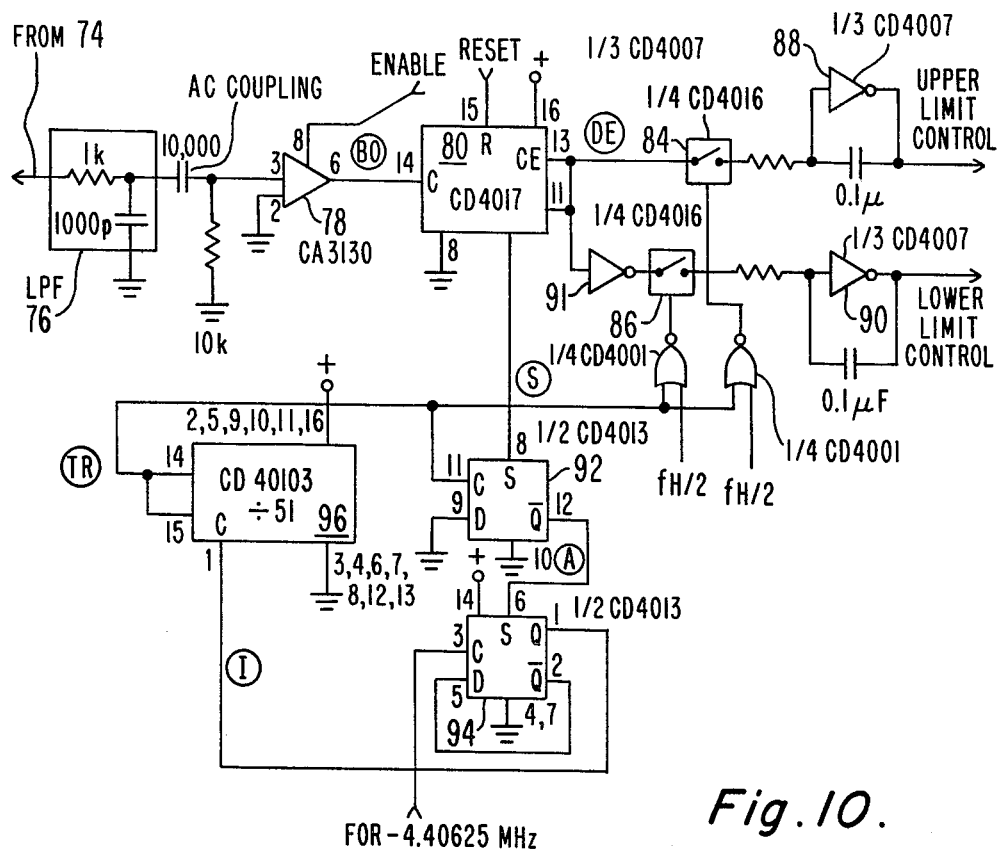
FIG. 10 shows a detailed implementation of the circuit of FIG. 5.

FIG. 10 shows the complete deviation control circuit for use in the RCA Model TK-47 SECAM camera. It should be noted that flip-flop 94 is used to divide the reference frequency by 2 because the reference divider (CD 40103 programmable divider) does not accept clock frequencies higher than 2.5 MHz.

Figure 11:
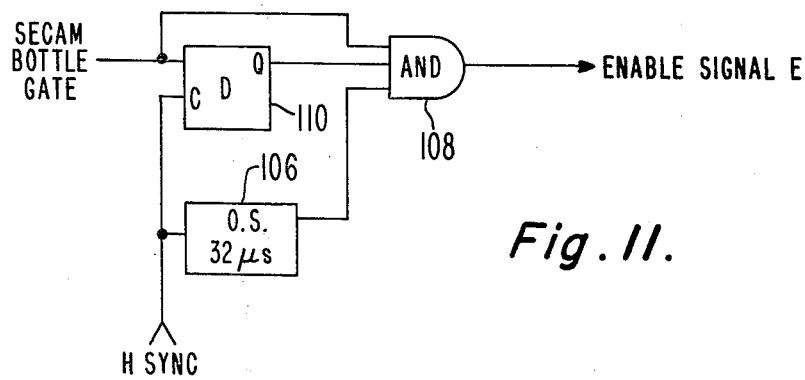
FIG. 11 shows a circuit for use with the invention.
Figure 12:
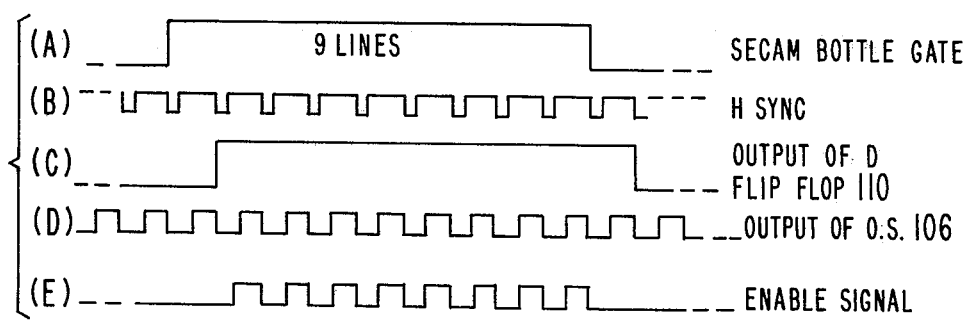
FIG. 12 shows some waveforms therein.

FIG. 11 shows a circuit for operating the enable pulse, while FIG. 12 shows some waveforms therein. A 32 microsecond one shot 106 receives horizontal sync pulses at its input, FIG. 11b, and supplies the signal of FIG. 11d to AND gate 108. A type D flip-flop 110 receives at its clock input the horizontal sync pulses, at its data input a standard SECAM bottle gate signal, FIG. 11a, which is present in SECAM encoders, and provides at its output the signal of FIG. 11c which is applied to a second input of the gate 108. The bottle gate signal is also applied to a third input of gate 108, so its output signal is the enable signal of FIG. 11.

What is claimed is:

1. A method for automatic deviation control of a SECAM signal, said method comprising comparing the deviated subcarrier frequency of vertical identification pulses present in a SECAM signal with the frequency of a reference signal, generating a limit control signal in accordance with the difference between said identification pulses and said reference signal, and applying said control signal to a deviation limiter circuit.

2. A method as claimed in claim 1, wherein said comparing step comprises frequency dividing said identification signal to provide a divided signal, frequency dividing said reference signal to provide time reference pulses, and coincidence detecting said divided signal using said time reference pulses.

3. A method as claimed in claims 1 or 2, wherein said generating step comprises integrating a signal that is in accordance with said difference.

4. A circuit for automatic deviation control of a SECAM signal having vertical color identification signals, said circuit comprising means for comparing the deviated subcarrier frequency of the vertical identification pulses with a reference signal and for generating a limit control signal in accordance with the difference between said identification pulses and said reference signal and a deviation limiter circuit having an input for receiving said control signal.

5. A circuit as claimed in claim 4, wherein said comparing means comprises a first frequency divider for dividing said identification pulses to provide a divided signal; a second frequency divider for dividing said reference signal to produce time reference pulses; a pair of coincident detectors each having a first input to receive said divided signal, a second inputs, and an output; a switch means for alternately applying said time reference pulses to said second input at a one half line frequency rate; and a pair of integrators coupled to said outputs respectively and to said limiter circuit.

6. A circuit as claimed in claim 5, wherein said second divider comprises a first flip-flop and a divide by fifty-one divider coupled to said flip-flop and to said switch means.

7. A circuit as claimed in claim 6, wherein said first divider comprises a divide by eight divider.

8. A circuit as claimed in claim 7, further comprising a second flip-flop coupled to said first flip-flop, and said divide by eight and fifty-one dividers.

9. A circuit as claimed in claim 5, further comprising a voltage controlled oscillator coupled to said limiter circuit, a phase detector having a first input coupled to said oscillator, a second input coupled to receive said reference signal and an output coupled to said first divider for providing said identification signals thereto.

* * * * *